(No Model.)

T. ROBERTS.
PROCESS OF REDUCING AND REFINING COPPER.

No. 568,700. Patented Sept. 29, 1896.

WITNESSES:
Frank E. Timanus
David E. Roberts.

Thomas Roberts INVENTOR.
BY William W. Varney
his ATTORNEY.

THE NORRIS PETERS CO., PHOTO-LITHO., WASHINGTON, D. C.

UNITED STATES PATENT OFFICE.

THOMAS ROBERTS, OF BALTIMORE, MARYLAND.

PROCESS OF REDUCING AND REFINING COPPER.

SPECIFICATION forming part of Letters Patent No. 568,700, dated September 29, 1896.

Application filed April 22, 1896. Serial No. 588,658. (No specimens.)

*To all whom it may concern:*

Be it known that I, THOMAS ROBERTS, a citizen of the United States, residing at Baltimore city, State of Maryland, have invented certain new and useful Improvements in Processes of Reducing and Refining Copper; and I do hereby declare the following to be a full, clear, and exact description of the invention, such as will enable others skilled in the art to which it appertains to make and use the same.

The objects of my invention are to facilitate the refining of copper, to decrease the number of operations, to increase the daily output of each furnace, and, further, to reduce the number of poles required in "poling," as well as to hasten the poling process. To accomplish the above, I introduce a steam air-blast into a reverberatory furnace upon the surface of the material placed therein.

To now fully explain my process, recourse may be had to the drawings, in which—

Figure 2:
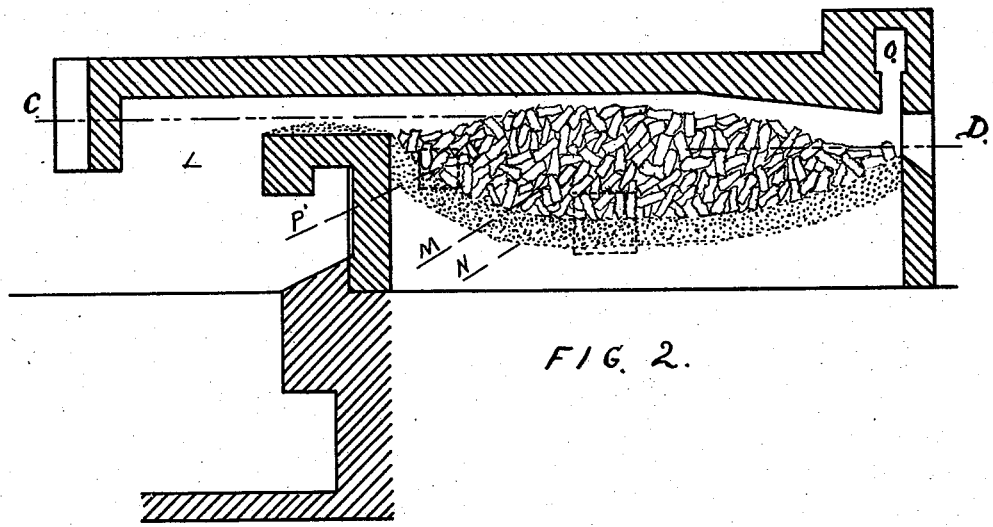
Figure 1:
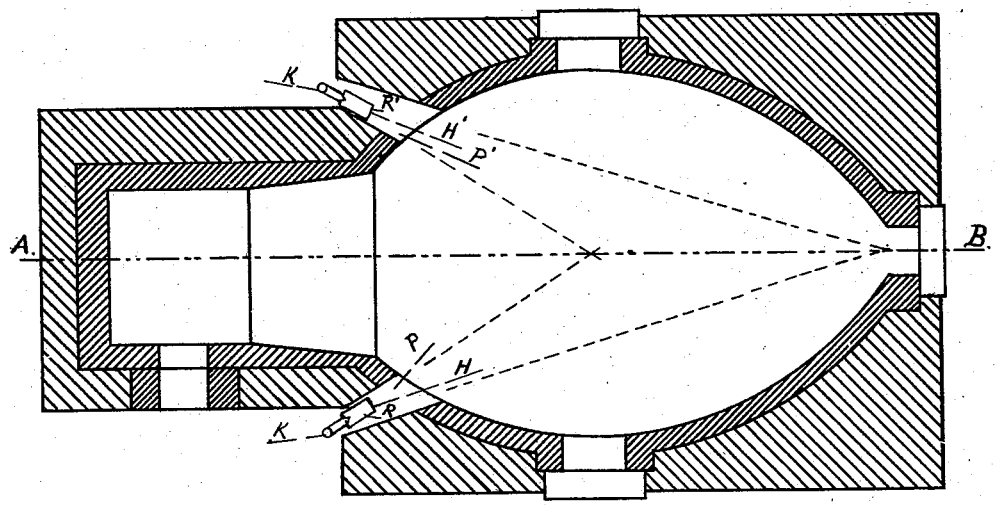

Figure 1 is a plan view of a reverberatory furnace. Fig. 2 is an elevation of the same, taken through the line A B of Fig. 1, Fig. 1 being taken through the line C D of Fig. 2.

N is the hearth upon which is piled the crude material M which is to be refined.

L is the source of heat.

O is the "uptake-flue".

P and P' are openings in the furnace through which I introduce a steam air-blast.

K and K' are steam-pipes blowing into R and R', which are open pipes for the purpose of mixing the steam with the air.

The whole apparatus H and H', which consists of K and K', R and R', can be moved on centers K and K' both horizontally and vertically.

The ores, consisting mostly of sulfids, oxids, or carbonates of copper, are placed in an open-hearth furnace and heated to a "white" heat for about four hours. The slag being "skimmed," the molten material is run into sand-beds. This metal is termed "coarse" metal. The coarse metal after being crushed is placed in a roasting-furnace, covering the bed of the furnace to the depth of four to six inches, and heated to a "red" heat twelve to twenty-four hours. The material is stirred and turned over by means of long iron paddles every hour, so as to expose a new surface to the action of the air and fire. This calcined coarse metal is melted, and after "skimming" is tapped into sand-beds as "blue" metal. The blue-metal "mattes" are placed in a reverberatory furnace in the manner as shown in Fig. 2 and heated until the mattes begin to "sweat." At this stage I introduce my improved process, which consists of a steam air-blast directed onto the mattes to a point near the center of the furnace, as indicated in Fig. 1. The steam may be saturated or superheated, and the air may be at ordinary temperature or highly heated. I do not wish to limit myself to either. This operation is continued until the blue-metal mattes have melted down, when the steam is shut off and the doors of the furnace are all closed. Every air-hole is stopped with clay and the heat of the furnace increased as rapidly as possible to a white heat for three or four hours, the door-plate removed, and a long iron rake passed through the contents of the furnace to make sure that the mass is perfectly fused. The surface is then skimmed and the contents of the furnace tapped into sand-beds as "regulus," thus gaining a stage (*i. e.*, "white" metal) over the old method. The reverberatory furnace is then charged with mattes of regulus in the same manner and operated as in the preceding stage, but in addition, that after skimming, the steam-blast is directed on the surface of the regulus until it reaches the "blister" condition. I claim that in this particular stage of regulus to blister by my process the furnace's output is greatly increased over that by former methods. The blister copper is tapped into sand-beds. The blister-copper mattes are then placed in the reverberatory furnace or refinery in the same manner and operated in the same way as in the previous stage. The surface is skimmed and the copper is "poled" until a certain "pitch" of the copper is reached. During the poling process the steam air-blast is directed upon the surface of the copper, where "boiling" takes place. When the poling process is begun, the oxid of copper formed at the surface is dissolved in the molten copper. An additional impurity is sulfur existing as copper sulfid in small quantity. When the "green" poles are placed in the molten copper, hydrocarbons are evolved, creating the boiling, at which place the steam air-blast is directed as described above. The dissociated gases, hydrogen, and oxygen of the steam, together with the oxygen supplied by the air, act upon the liberated hydrocarbons, forming free hydrogen and carbon monoxid. The hydrogen and carbon monoxid reduce the copper oxid to metallic copper, while the sulfur is liberated as hydrogen sulfid and sulfur dioxid. I claim at this stage the number of poles formerly used in poling is considerably reduced.

The chemistry of my process may be expressed briefly and in general as follows: The steam on entering the furnace reaches a high degree of temperature, and thereby attains a state in which it is easily broken up into the gases hydrogen and oxygen, which are important agents in reducing and oxidizing. The combustible materials and gases coming over the "bridge" from the source of heat are oxidized by the oxygen contained in the unstable heated steam and the oxygen in the air of the steam air-blast.

(A) The hydrocarbons and free carbon by oxidation give rise to carbon monoxid, (CO,) water, ($H_2O$,) and free hydrogen, (H,) which, acting upon the oxids and sulfids of the copper, produce metallic copper and free-hydrogen sulfid, ($H_2S$,) which reactions may, in the absence of complete chemical analysis of the gases formed in different parts of the furnace during the melting and poling stages of the process, be represented by the following equations. It is highly probable that carbon monoxid in the presence of the steam is oxidized and hydrogen is liberated thus:

$$CO + H_2O = CO_2 + 2H.$$

The methan would also take oxygen from the steam as follows:

$$CH_4 + H_2O = CO + 6H,$$

the above carbon monoxid and hydrogen being free to act upon the copper oxids and sulfids, which action may be represented as follows:

$$CuO + CO = Cu + CO_2$$
$$CuO + 2H = Cu + H_2O$$
$$CuS + 2H = Cu + H_2S.$$

The free carbon monoxid (CO) uniting also with free oxygen (O) of the air or dissociated water is an important factor in giving rise to great heat, which by force of the steam air-blast is well distributed throughout the furnace, ($CO + O = CO_2$.) The free hydrogen (H) serves as an important agent in the reduction of sulfur that may be present as a sulfid, ($CuS + 2H = Cu + H_2S$,) and the oxygen (O) of the dissociated steam oxidizes the unburned material and gases coming over the bridge, giving rise to powerful reducing agents, viz: free hydrogen (H) and carbon monoxid, (CO.)

(B) The hydrogen of the dissociated steam acts directly upon the oxids and sulfids of copper, reducing to metallic copper and freeing the sulfur as hydrogen sulfid, ($H_2S$.)

$$CuO + CuS + 4H = 2Cu + H_2O + H_2S.$$

The copper carbonates, by roasting and melting, pass over to the oxids, which are reduced in presence of free hydrogen and carbon monoxid, the hydrogen acting directly upon the copper oxid and copper sulfid, the oxygen acting indirectly upon the copper sulfid through the oxidation of unburned materials from the source of heat.

I would state that I am aware that steam and air have been used in the process of roasting or oxidizing metallic sulfids, chiefly pyrites, to recover the sulfur, but not in the reducing or melting process; that steam and air have been used in the refining of copper by blowing into and through the melted charge, but not upon the surface of the same, and that steam alone has been used for oxidizing.

Having thus described my invention, what I claim, and wish to secure by Letters Patent, is—

1. In the production of copper from its compounds with non-metallic elements, the process, consisting in melting the compound, admitting steam and air upon the surface of the molten mass during the melting, in the presence of unburned gases and materials of combustion, and thereby effecting complete combustion, decomposition of the steam and reduction of the copper, substantially as described.

2. In the production of copper from its compounds with oxygen the process consisting in melting the charge, poling the same, admitting steam and air upon the surface of the molten mass during the poling in the presence of hydrocarbons generated by the green poles being introduced into the molten mass, thereby effecting complete combustion of the hydrocarbons, decomposition of the steam, and reduction of copper oxid, substantially as described.

In testimony whereof I affix my signature in presence of two witnesses.

THOMAS ROBERTS.

Witnesses:
WILLIAM W. VARNEY
DAVID E. ROBERTS.